(12) United States Patent
Eisler et al.

(10) Patent No.: US 12,282,678 B2
(45) Date of Patent: *Apr. 22, 2025

(54) SYNCHRONOUS REPLICATION

(71) Applicant: NetApp Inc., San Jose, CA (US)

(72) Inventors: Michael Robin Eisler, Colorado Springs, CO (US); Santosh Ananth Rao, Santa Clara, CA (US); Akhil Kaushik, San Jose, CA (US); Yuedong Mu, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/448,224

(22) Filed: Aug. 11, 2023

(65) Prior Publication Data

US 2024/0126470 A1 Apr. 18, 2024

Related U.S. Application Data

(63) Continuation of application No. 17/683,009, filed on Feb. 28, 2022, now Pat. No. 11,726,697, which is a
(Continued)

(51) Int. Cl.
*G06F 3/06* (2006.01)
*G06F 11/20* (2006.01)

(52) U.S. Cl.
CPC ............ *G06F 3/065* (2013.01); *G06F 3/0619* (2013.01); *G06F 3/067* (2013.01);
(Continued)

(58) Field of Classification Search
CPC ........ G06F 3/065; G06F 3/0619; G06F 3/067; G06F 11/2058; G06F 11/2069;
(Continued)

(56) References Cited

U.S. PATENT DOCUMENTS 6,052,797 A 4/2000 Ofek et al.
6,721,901 B1 4/2004 Mcbrearty et al.
(Continued)

FOREIGN PATENT DOCUMENTS

WO 0104754 A2 1/2001

OTHER PUBLICATIONS

International Search Report and Written Opinion for Application No. PCT/US2016/067741 mailed Mar. 20, 2017, 12 pages.
(Continued)

*Primary Examiner* — Yair Leibovich
(74) *Attorney, Agent, or Firm* — Jaffery Watson Hamilton & DeSanctis LLP

(57) ABSTRACT

One or more techniques and/or computing devices are provided for synchronous replication. For example, synchronous replication relationships are established between a first storage object (e.g., a file, a logical unit number (LUN), a consistency group, etc.), hosted by a first storage controller, and a plurality of replication storage objects hosted by other storage controllers. In this way, a write operation to the first storage object is implemented in parallel upon the first storage object and the replication storage objects in a synchronous manner, such as using a zero-copy operation to reduce overhead otherwise introduced by performing copy operations. Reconciliation is performed in response to a failure so that the first storage object and the replication storage objects comprise consistent data. Failed write operations and replication write operations are retried, while enforcing a single write semantic. Dependent write order consistency is enforced for dependent write operations, such as overlapping write operations.

19 Claims, 13 Drawing Sheets

Related U.S. Application Data continuation of application No. 16/683,427, filed on Nov. 14, 2019, now Pat. No. 11,262,931, which is a continuation of application No. 14/980,526, filed on Dec. 28, 2015, now Pat. No. 10,496,320.

(52) U.S. Cl.
CPC ...... *G06F 11/2058* (2013.01); *G06F 11/2069* (2013.01); *G06F 11/2071* (2013.01); *G06F 11/2082* (2013.01); *G06F 2201/84* (2013.01)

(58) Field of Classification Search
CPC ............. G06F 11/2071; G06F 11/2082; G06F 2201/84; G06F 11/2064; G06F 11/2076
USPC ...................................................... 714/6.12
See application file for complete search history.

(56) References Cited

U.S. PATENT DOCUMENTS

| | | |
|---|---|---|
| 7,149,818 B2 | 12/2006 | Chow et al. |
| 7,979,652 B1 | 7/2011 | Sivasubramanian |
| 9,348,831 B1 | 5/2016 | Mccline et al. |
| 10,244,069 B1 | 3/2019 | Michaud et al. |
| 10,496,320 B2 | 12/2019 | Eisler et al. |
| 11,262,931 B2 | 3/2022 | Eisler et al. |
| 11,726,697 B2 * | 8/2023 | Eisler ...................... G06F 3/065 714/6.21 |
| 2003/0014523 A1 | 1/2003 | Teloh et al. |
| 2003/0188218 A1 | 10/2003 | Lubbers et al. |
| 2005/0050286 A1 | 3/2005 | Crowley et al. |
| 2006/0064558 A1 | 3/2006 | Cochran et al. |
| 2006/0111794 A1 | 5/2006 | Wysuph et al. |
| 2006/0112251 A1 | 5/2006 | Karr et al. |
| 2006/0129612 A1 | 6/2006 | Maccormick et al. |
| 2007/0235537 A1 | 10/2007 | Yoneda et al. |
| 2012/0254342 A1 | 10/2012 | Evans |
| 2012/0323850 A1 | 12/2012 | Hildebrand et al. |
| 2013/0185479 A1 | 7/2013 | Lin |
| 2014/0095758 A1 | 4/2014 | Smith et al. |
| 2014/0195871 A1 | 7/2014 | Clayton et al. |
| 2014/0298078 A1 | 10/2014 | Keremane et al. |
| 2015/0089140 A1 | 3/2015 | Sridharan et al. |
| 2015/0095627 A1 | 4/2015 | Dechene et al. |
| 2015/0254298 A1 | 9/2015 | Bourbonnais et al. |
| 2018/0357140 A1 | 12/2018 | Xiang et al. |
| 2019/0034505 A1 | 1/2019 | Renauld et al. |
| 2022/0187993 A1 | 6/2022 | Eisler et al. |

OTHER PUBLICATIONS

Wikipedia "disk mirroring" pages of date Oct. 29, 2015, retrieved using WBM drom. URL: https://web.archive.org/web/20151029160620/ https://en.wikipedia.org/wiki/Disk_mirroring.

Wikipedia "Zero-copy" page from date Oct. 1, 2015, retrieved using the Way Back Machine, from URL: https://web.archive.org/web/20151001142624/ URL: https://en.wikipedia.org/wiki/Zero-copy Year: 2015.

* cited by examiner

SYNCHRONOUS REPLICATION

RELATED APPLICATIONS

This application claims priority to and is a continuation of U.S. application Ser. No. 17/683,009, filed on Feb. 28, 2022, now allowed, titled "SYNCHRONOUS REPLICATION," which claims priority to and is a continuation of U.S. Pat. No. 11,262,931, filed on Nov. 14, 2019, titled "SYNCHRONOUS REPLICATION," which claims priority to and is a continuation of U.S. Pat. No. 10,496,320, filed on Dec. 28, 2015 and titled "SYNCHRONOUS REPLICATION," which are incorporated herein by reference.

BACKGROUND

Many storage networks may implement data replication and/or other redundancy data access techniques for data loss protection and non-disruptive client access. For example, a first storage cluster may comprise a first storage controller configured to provide clients with primary access to data stored within a first storage device and/or other storage devices. A second storage cluster may comprise a second storage controller configured to provide clients with primary access to data stored within a second storage device and/or other storage devices. The first storage controller and the second storage controller may be configured according to a disaster recovery relationship, such that the second storage controller may provide (e.g., a switchover operation may be performed where the second storage controller assumes ownership of the secondary storage device and/or other storage devices previously owned by the first storage controller so that the second storage controller may provide clients with failover access to replicated data within such storage devices). In an example of a logical replication scheme, the second storage controller has ownership of the replicated data. The second storage controller may provide read-only access to the replicated data. The second storage controller may convert the replicated data to full read-write access upon failover. In an example of physical replication, the storage device, comprising the replicated data, is owned by the first storage controller until a failover/switchover to the second storage controller occurs.

In an example, the second storage cluster may be located at a remote site to the first storage cluster (e.g., storage clusters may be located in different buildings, cities, thousands of kilometers from one another, etc.). Thus, if a disaster occurs at a site of a storage cluster, then a surviving storage cluster may remain unaffected by the disaster (e.g., a power outage of a building hosting the first storage cluster may not affect a second building hosting the second storage cluster in a different city).

In an example, two storage controllers within a storage cluster may be configured according to a high availability configuration, such as where the two storage controllers are locally connected to one another and/or to the same storage devices. In this way, when a storage controller fails, then a high availability partner storage controller can quickly takeover for the failed storage controller due to the local connectivity. Thus, the high availability partner storage controller may provide clients with access to data previously accessible through the failed storage controller.

In an example of a high availability configuration, high availability to data may be provided without using shared storage. In particular, high availability to data is provided using a synchronous replicated copy of a primary storage object. The high availability to data may be provided through a software defined architecture, using synchronous replication, and is not limited to merely two storage controllers.

Various replication and synchronization techniques may be used to replicate data (e.g., client data), configuration data (e.g., a size of a volume, a name of a volume, etc.), and/or write caching data (e.g., cached write operations) between storage controllers and/or storage devices. In an example of synchronization, a synchronous replication relationship may be implemented between the first storage controller and the second storage controller, such that an incoming write operation to the first storage controller is locally implemented upon a first storage object (e.g., a file, a logical unit number (LUN), a LUN spanning multiple volumes, or any other type of object) by the first storage controller and remotely implemented upon a second storage object (e.g., maintained as a fully synchronized copy of the first storage object) by the second storage controller before an acknowledgement is provided back to a client that sent the incoming write operation. Unfortunately, various issues such as a failure of a storage controller, a transient network issue, and/or other issues may cause replicated copies on the first storage controller and the second storage controller to become out-of-sync.

DETAILED DESCRIPTION

Figure 1:
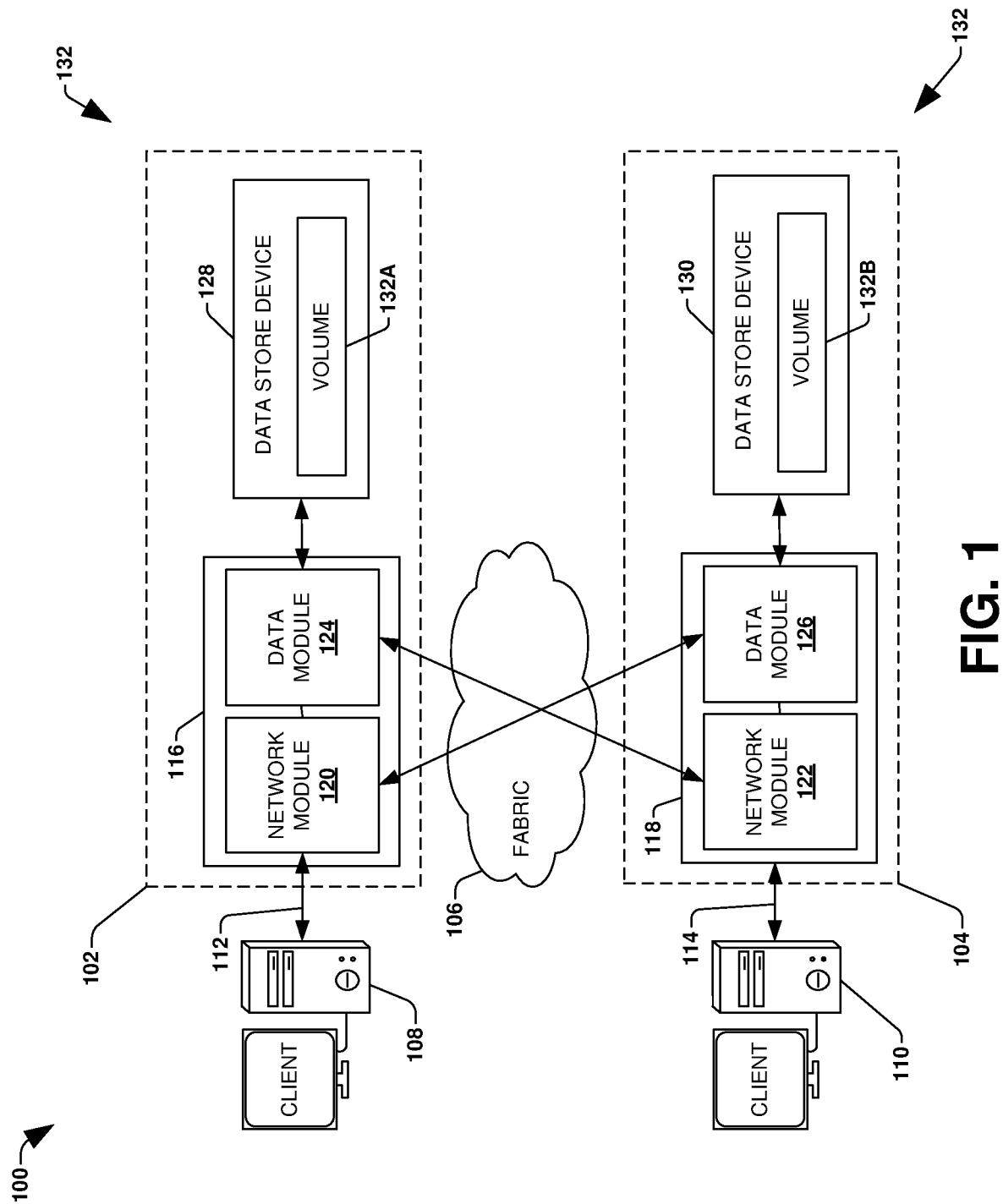
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for synchronous replication are provided herein. In an example, synchronous replication relationships may be maintained between a first storage object (e.g., a file, a LUN, a consistency group, or any other type of object configured to store data), hosted by a first storage controller, and any number of replication storage objects (e.g., a first replication storage object hosted by a second storage controller, a second replication storage object hosted by a third storage controller, etc.). In this way, synchronous replication, using a parallel splitting based architecture, allows for more than 1 synchronous copy to be maintained without a linear increase in client latency or other overhead. Various features may be implemented for the synchronous replication relationship. In an example, a reconciliation (e.g., a quick reconciliation is performed within a data path and is done at a granularity of affected operations, while maintain synchronous copies, such as replication storage objects, in a synchronous state) may be performed in response to an error (e.g., an I/O operation may fail to be implemented by the first storage controller upon the first storage object, thus causing a data divergence), and thus the reconciliation may be performed to make the first storage object and the replication storage objects data consistent. The reconciliation may be a quick reconciliation that is relatively faster than alternate approaches that involve taking the synchronous replication relationship out-of-sync and working through a costly resync operation to achieve reconciliation. In another example, an inflight time tracking module may be used to enforce a protocol timeout guarantee and/or perform retries of replication write operations without violating a single write semantic for the replication storage objects so that duplicate or stale replication write operations are not implemented.

In another example, a zero-copy operation may be used to efficiently implement write operations and/or replication write operations without overhead associated with copy operations. The zero-copy operation has low CPU overhead in comparison to a full copy based technique which is computationally intensive. The zero-copy operation is deployed to create a replication file operation based upon an intercepted client write operation. In another example, dependent write order consistency may be maintained for dependent write operations (e.g., dependent write operations may be serially implemented). In another example, load balancing may be implemented between replication storage objects. The ability to pair a storage object with any number of replication storage objects allows for software scale out for storage (e.g., high availability scale out, write performance scale out using splitter sharding, read performance scale out using load balancing amongst multiple replication storage objects, etc.) and reduces takeover time for a surviving storage controller to takeover for a failed storage controller. A local replication storage object may be used for self-healing, such as in conjunction with file system corruption detection process. Maintaining multiple replication storage objects across multiple data centers enables zero or near-zero recovery point objective (RPO) data protection. Also, long distance (e.g., between data centers) virtual machine move operations may be enabled by integrating the synchronous replication relationships into virtualization functionality.

To provide context for synchronous replication, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and data modules 124, 126. Network moduless 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device 130 by sending a request through the data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In one embodiment, the host devices 108, 110 can exchange information with the network modules 120, 122 residing in the nodes 116, 118 (e.g., network hosts) in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that synchronous replication may be implemented within the clustered network environment 100. In an example, a synchronous replication relationship may be established between the volume 132A (e.g., or a subset of the volume 132A, such as a file, LUN, subdirectory, or any other type of storage object) of node 116 (e.g., a first storage controller), the volume 132B (e.g., or a subset of the volume 132B, such as a file, LUN, subdirectory, or any other type of storage object) of the node 118 (e.g., a second storage controller), and/or any other number of replication storage objects. It may be appreciated that synchronous replication may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
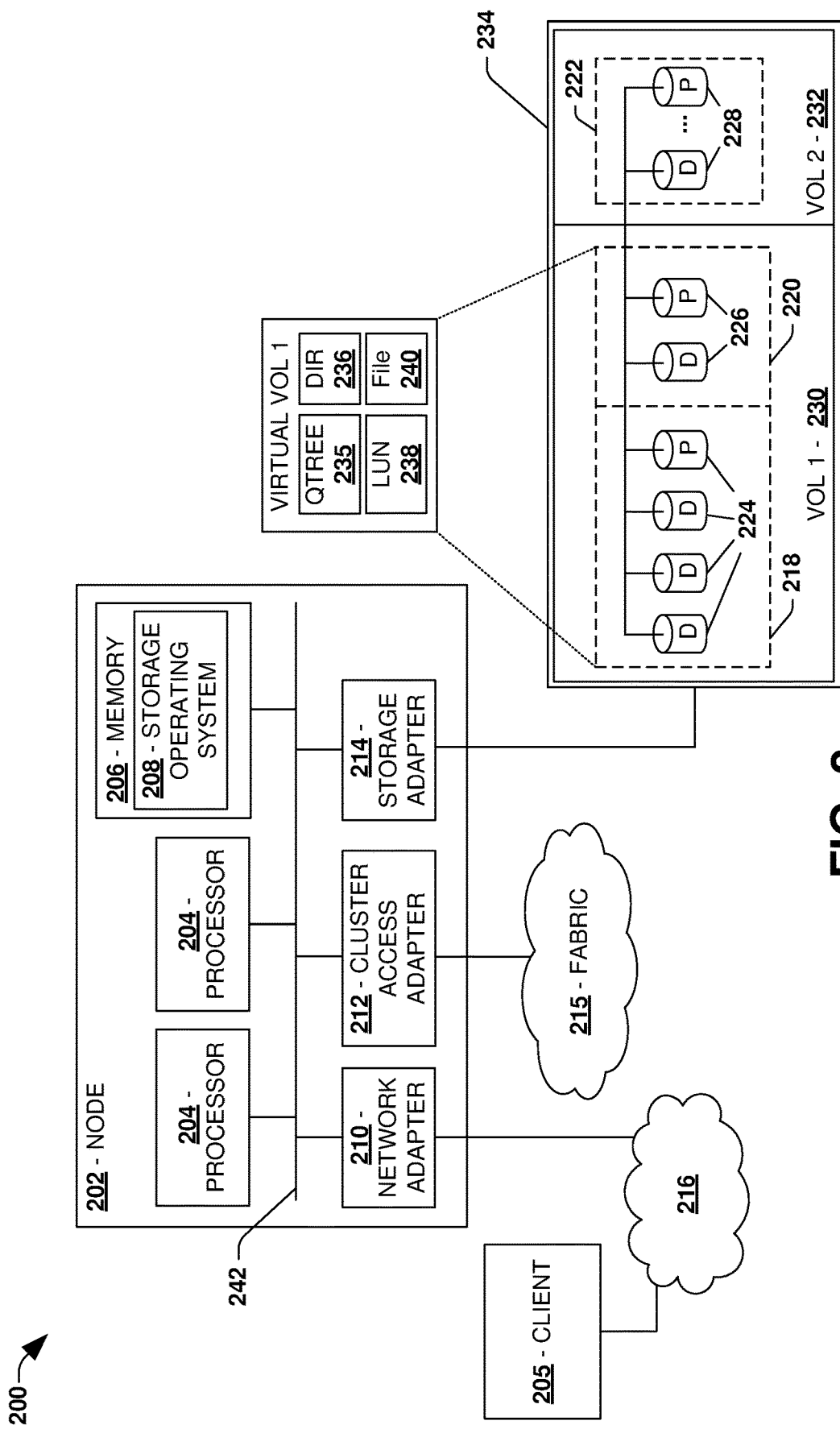
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and network adapters 210, 212, 214 for storing related software application code and data structures. The processors 204 and network adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In one embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that synchronous replication may be implemented for the data storage system 200. In an example, a synchronous replication relationship may be established between the volume 230 (e.g., or a subset of the volume 230, such as the file 240, the LUN 238, a subdirectory, or any other type of storage object) of the node 202 (e.g., a first storage controller) and any other number of replication storage objects hosted by storage controllers. It may be appreciated that synchronous replication may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
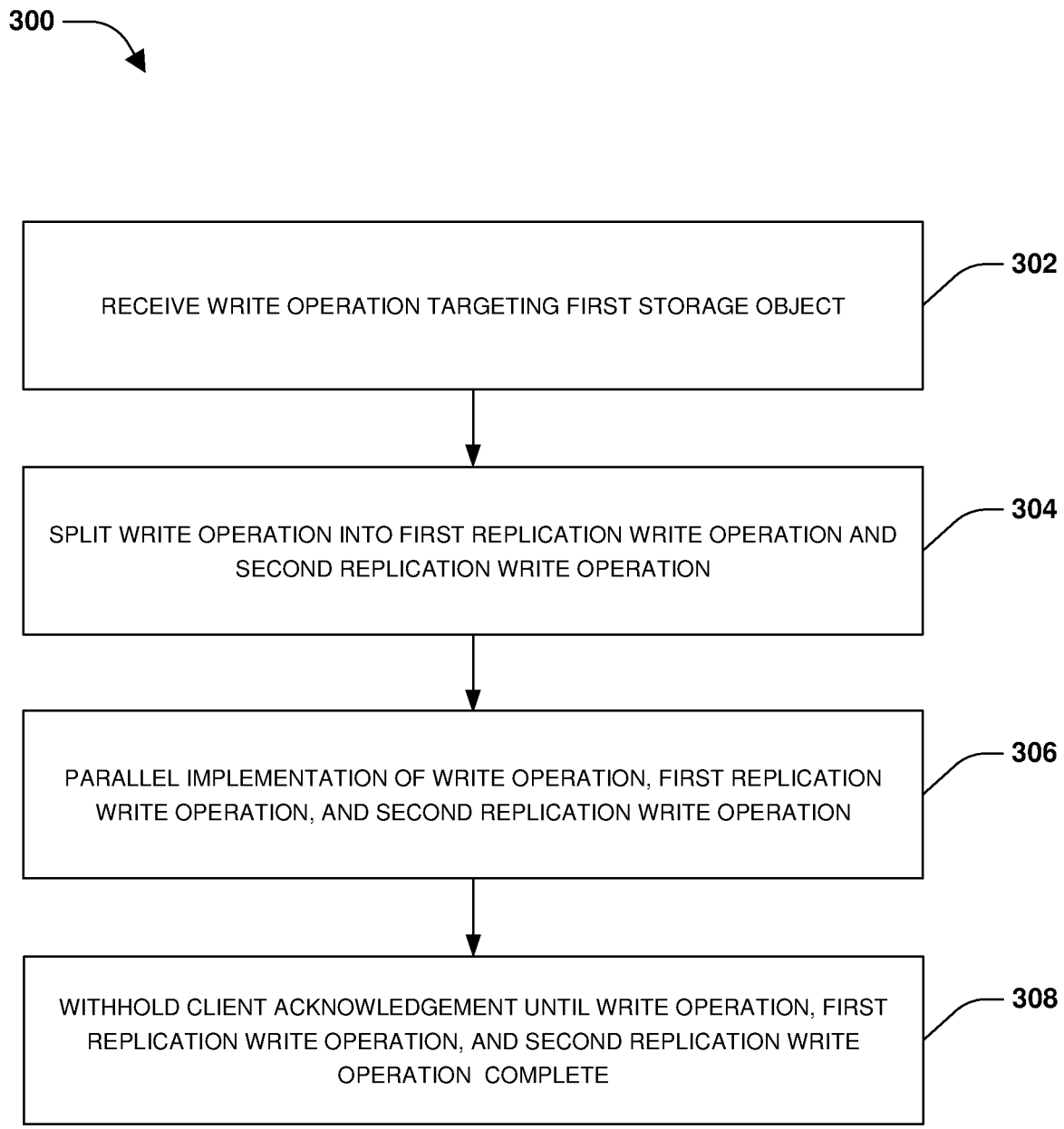
FIG. 3 is a flow chart illustrating an exemplary method of synchronous replication.

One embodiment of synchronous replication is illustrated by an exemplary method 300 of FIG. 3. In an example, a first storage controller may host a first storage object, such as a file, a LUN, a LUN spanning across multiple volumes, a volume, a subdirectory within the volume, or any other type of object used to store data. A second storage controller may host a first replication storage object that is a synchronous replicated copy of the first storage object. A third storage controller may host a second replication storage object that is a synchronous replicated copy of the first storage object. It may be appreciated that any number of replication storage objects may be used as synchronous replicated copies of the first storage object. The replication storage objects may be hosted within the same or different data centers with respect to the first storage object and one another. In an example, the first storage object is exposed with read and write access to clients, while the replication storage objects are exposed with read only access during normal operation and are exposed with read and write access after a failover is performed. Synchronous replication relationships may be established between the first storage object and the replication storage objects, such that a modification to the first storage object (e.g., a write operation from a client) is replicated to the first replication storage object, the second replication storage object, and/or other replication storage objects before an acknowledgement is provided back to the client, thus preserving data consistency between the first storage object and the replication storage objects. Because multiple replication storage objects are maintained, load balancing may be performed between the replication storage objects (e.g., load balancing for read operations may be achieved by servicing read requests from either of the synchronous replicated copies).

At 302, a write operation, targeting the first storage object, is received. For example, an interceptor may intercept the write operation at the first storage controller before the write operation reaches a file system of the first storage controller. The write operation may be identified as a modification to a storage object configured for synchronous replication, such as the first storage object that has the synchronous replication relationships with the first replication storage object hosted by the second storage controller, the second replication storage object hosted by the third storage controller, and/or other replication storage objects. Accordingly, at 304, the write operation may be split, by a splitter for the first storage object, into a first replication write operation targeting the first replication storage object, a second replication write operation targeting the second replication storage object, etc.

At 306, the write operation may be implemented upon the first storage object by the first storage controller, the first replication write operation may be implemented upon the first replication storage object by the second storage controller, and the second replication write operation may be implemented upon the second replication storage object by the third storage controller in parallel. In an example, a zero-copy operation (e.g., a zero-copy methodology) may be performed by the storage controllers, which may use a data reference in place of copying data associated with the write operation. At 308, a client acknowledgement that the write operation is completed is withheld until the write operation, the first replication write operation, and the second replication write operation are complete. Once the operations are complete, the client acknowledgement may be released and sent to a client that issued the write operation.

In an example, a dependent write order consistency may be maintained for write operations. For example, a second write operation may be received. A dependency between the write operation and the second write operation may be determined. For example, the dependency may be explicitly defined or the dependency may be determined based upon the write operation and the second write operation targeting an overlapping region for modification (e.g., overlapping data blocks of the first storage object). Accordingly, the dependent write order consistency may be enforced for the write operation and the second write operation. For example, the write operation and the second write operation may be serially implemented.

In an example, potential data divergence may be reconciled between the first storage object and replication storage objects. For example, a failure associated with the first storage controller (e.g., or any other storage controller) may be identified (e.g., a transient communication error, a reboot, an inability to implement an I/O operation, or any other unavailability that may affect the completion of the write operation, the first replication write operation, the second replication write operation, etc.). According, a reconciliation between the first storage object, the first replication storage object, and the second reconciliation storage object may be performed. The reconciliation may be a quick reconciliation that is relatively faster than alternate approaches that involve taking the synchronous replication relationship out-of-sync and working through a costly resync operation to achieve reconciliation. For example, a current client acknowledgement for a current write operation associated with the failure may be withheld (e.g., a local implement of the current write operation by the first storage controller may have failed). Content, targeted by the current write operation, may be read form the first storage object. The content may be written to the first replication storage object and the second replication storage object, thus resulting in data consistency between the storage objects. Accordingly, the current client acknowledgement may be released. In an example, responsive to successfully writing the content so that data within the first storage object, the first replication storage object, and the second replication storage object is consistent (e.g., in order to mitigate any false positives for a subsequent data integrity validation check), one or more consistency points may be used to perform a data integrity validation to flag data corruption or data loss issues.

In an example, an inflight time tracking module may be used to track a lifecycle of the write operation (e.g., track the write operation and the replication write operations within a sync replication path). Responsive to the lifecycle indicating that performance of the first replication write operation and/or the second replication write operation violates a protocol timeout guarantee, the client acknowledgment may be released. Failure or success may be determined based upon a result of the local write operation. If the local write operation succeeded, then the client response will be success. If the local write operation failed, then the client response will be failed. If the synchronous replication relationship is transitioned into an out-of-sync state, then a subsequent automatic resync may be used as a reconciliation operation as opposed to performing a separate quick reconciliation. Responsive to the lifecycle indicating that performance of the first replication write operation has encountered an issue, the first replication write operation may be retried as a retry first replication write operation. A single write semantic may be enforced for the first replication storage object. The single write semantic may specify that the first operation received is to be performed and that subsequent operations are to be disregarded, which may improve resiliency by avoiding the implementation of duplicate or stale write operations. For example, responsive to the first replication write operation being successfully performed, the retry first replication write operation may be discarded. Responsive to the retry first replication write operation being successfully performed, the first replication write operation may be discarded.

In an example, metadata operations (e.g., an application consistency point creation operation, a resync point creation operation, a clone operation, an attribution modification operation, a create operation, a volume operation, a LUN operation, a delete operation, etc.) may be synchronously replicated between the first storage controller, the second storage controller, and the third storage controller. For example, a metadata operation for the first storage controller may be received. The metadata operation may be implemented upon the first storage controller, and may be replicated to the second storage controller and the third storage controller.

Figure 4A:
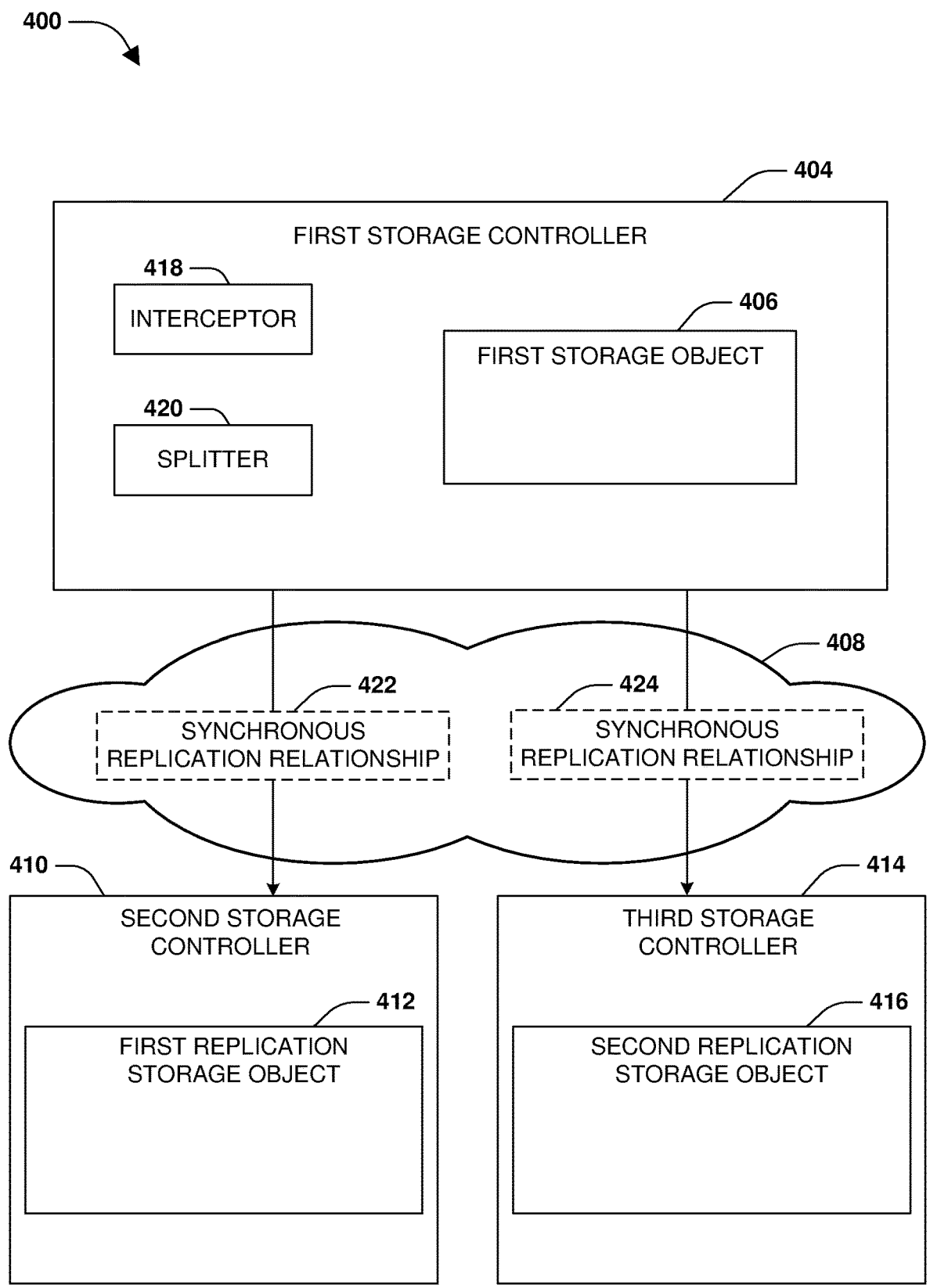
FIG. 4A is a component block diagram illustrating an exemplary computing device for synchronous replication, where synchronous replication relationships are established.

FIGS. 4A-4I illustrate examples of a system 400 for synchronous replication. FIG. 4A illustrates a first storage controller 404, a second storage controller 410, a third storage controller 414, and/or any other number of storage controllers connected over a network 408 (e.g., the storage controllers may be in the same or different data centers and/or clusters). The first storage controller 404 may provide clients with access to a first storage object 406 (e.g., a file, a LUN, a consistency group of files or LUNs, or any other object configured to store data). A first synchronous replication relationship 422 may be established between the first storage object 406 and a first replication storage object 412, hosted by the second storage controller 410, that is a synchronous replication copy of the first storage object 406. A second synchronous replication relationship 424 may be established between the first storage object 406 and a second replication storage object 416, hosted by the third storage controller 414, that is a synchronous replication copy of the first storage object 406. It may be appreciated the synchronous replication relationships may be established with any number of replication storage objects within similar or different data centers.

The first storage object 406 may be associated with an interceptor 418 configured to intercept write operations (e.g., before the write operations reach a file system of the first storage controller 404) to determine whether such write operations target regions of storage configured to synchronous replication, such as the first storage object 406. The interceptor 418 is configured to pass such write operations to a splitter 420 (e.g., a single splitter for all regions or a splitter per region such as a splitter for the first storage object 406) for splitting and synchronous replication implementation.

Figure 4B:
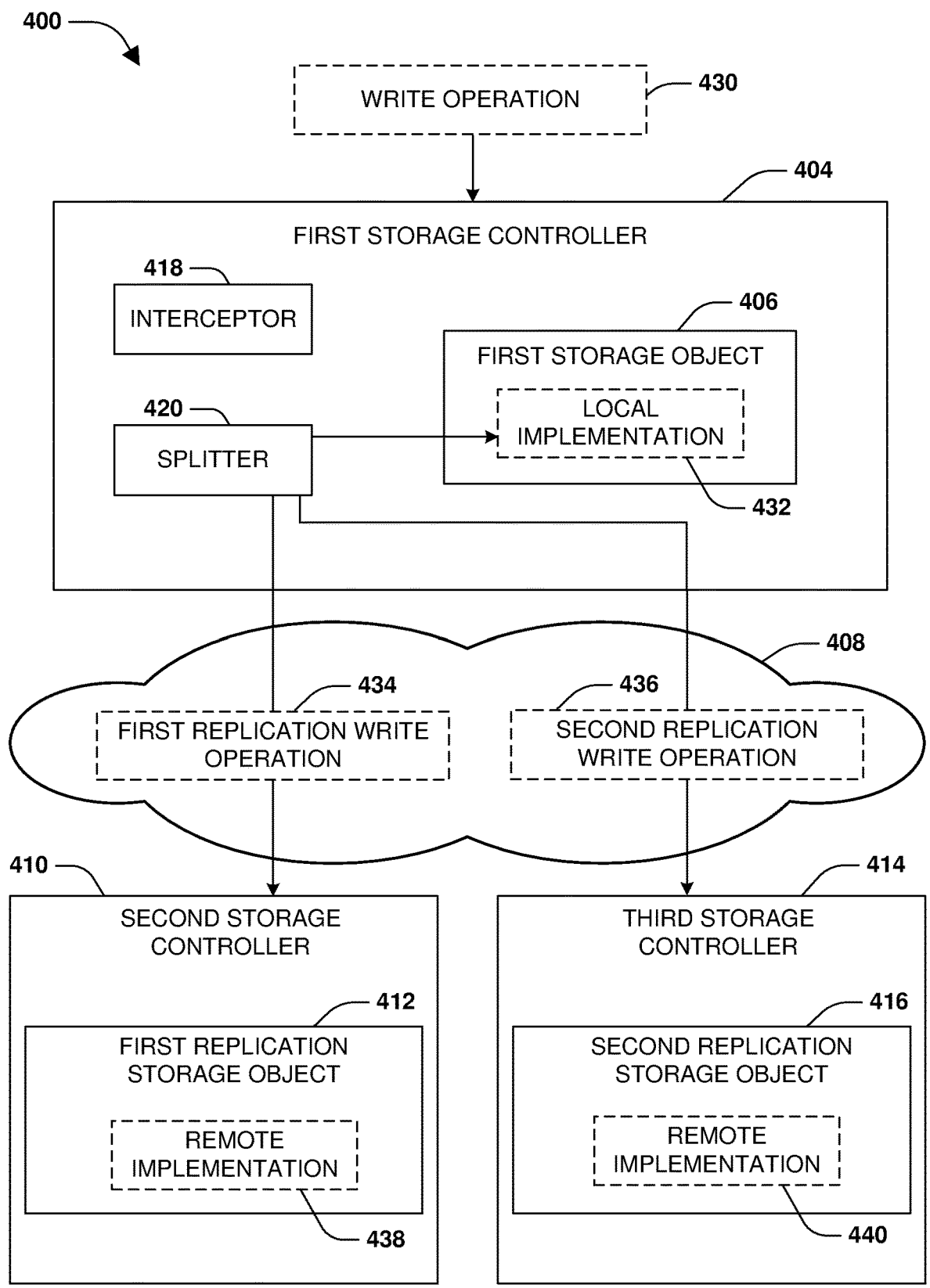
FIG. 4B is a component block diagram illustrating an exemplary computing device for synchronous replication, where a write operation and replication write operations are implemented in parallel.
Figure 4C:
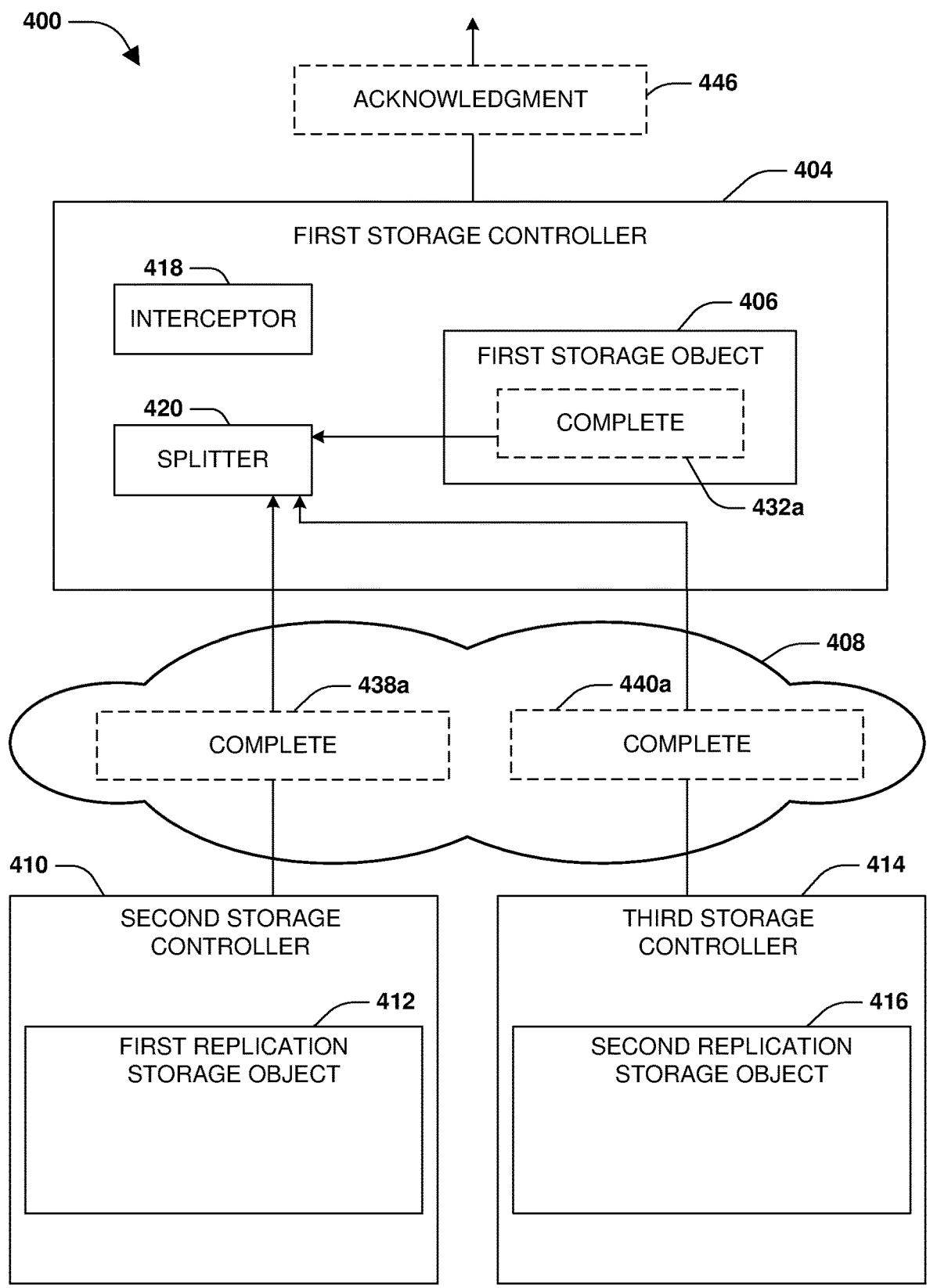
FIG. 4C is a component block diagram illustrating an exemplary computing device for synchronous replication, where an acknowledgment is sent to a client.

FIG. 4B illustrates a write operation 430, targeting the first storage object 406, being intercepted by the interceptor 418. Because the write operation 430 targets the first storage object 406 having the first synchronous replication relationship 422 and the second synchronous replication relationship 424, the interceptor 418 may pass the write operation 430 to the splitter 420 for the first storage object 406. The splitter 420 may split the write operation 430 into a first replication write operation 434, targeting the first replication storage object 412, and a second replication write operation 436 targeting the second replication storage object 416. Accordingly, the write operation 430, the first replication write operation 434, and the second replication write operation 436 may be implemented in parallel. For example, the write operation 430 may be locally implemented 432 upon the first storage object 406, the first replication write operation 434 may be remotely implemented 438 upon the first replication storage object 412, and the second replication write operation 436 may be remotely implemented 440 upon the second replication storage object 416. FIG. 4C illustrates a client acknowledgment 446 being withheld during the parallel implementation, and subsequently being sent to a client that submitted the write operation 430 after the write operation 430 is successfully implemented 432a upon the first storage object 406, the first replication write operation 434 is successfully implemented 438a upon the first replication storage object 412, and the second replication write operation 436 is successfully implemented 440a upon the second replication storage object 416

Figure 4D:
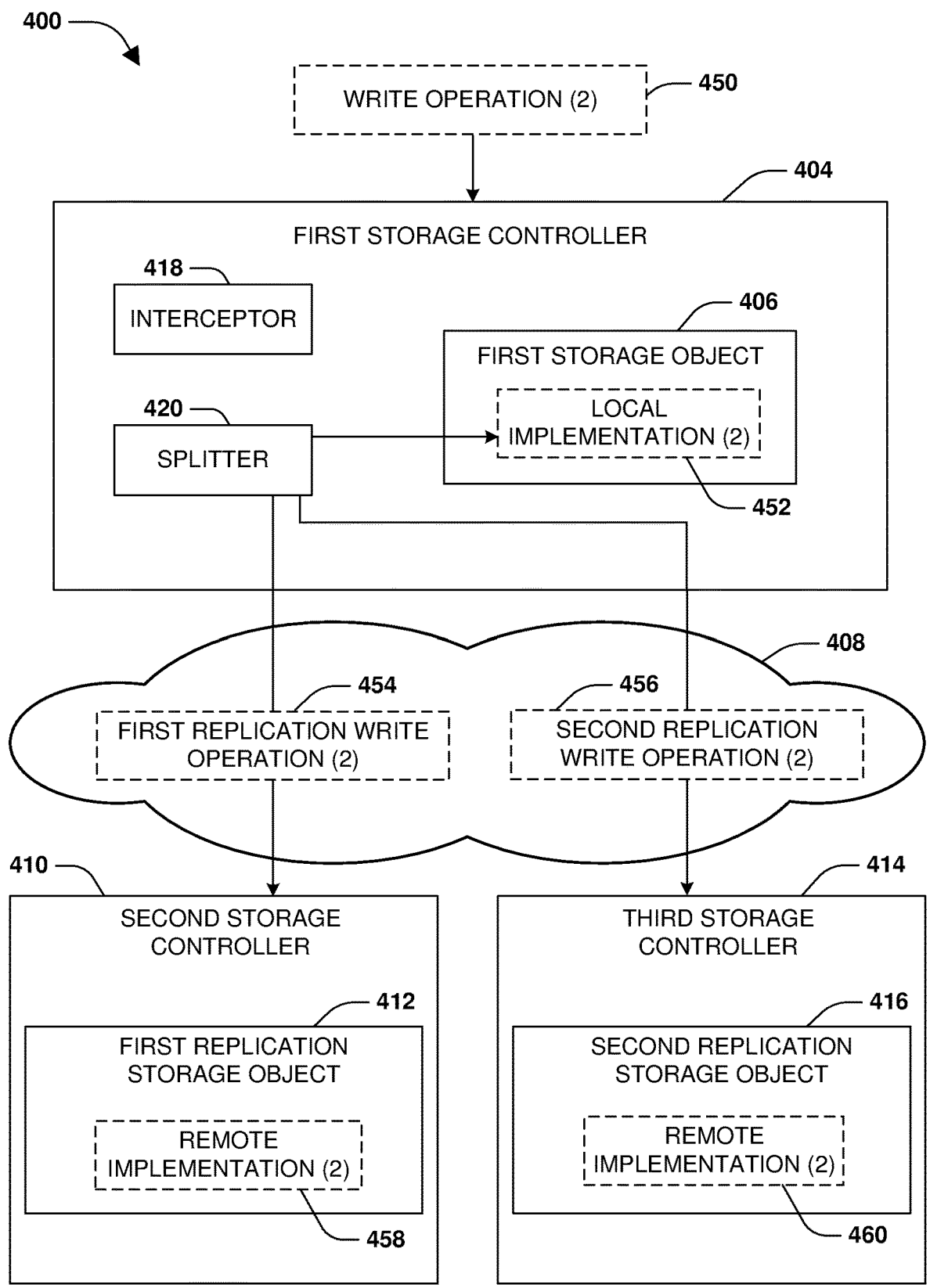
FIG. 4D is a component block diagram illustrating an exemplary computing device for synchronous replication, where a write operation and replication write operations are implemented in parallel.

FIG. 4D illustrates a write operation (2) 450, targeting the first storage object 406, being intercepted by the interceptor 418. Because the write operation (2) 450 targets the first storage object 406 having the first synchronous replication relationship 422 and the second synchronous replication relationship 424, the interceptor 418 may pass the write operation (2) 450 to the splitter 420 for the first storage object 406. The splitter 420 may split the write operation (2) 450 into a first replication write operation (2) 454, targeting the first replication storage object 412, and a second replication write operation (2) 456 targeting the second replication storage object 416. Accordingly, the write operation (2) 450, the first replication write operation (2) 454, and the second replication write operation (2) 456 may be implemented in parallel. For example, the write operation (2) 450 may be locally implemented 452 upon the first storage object 406, the first replication write operation (2) 454 may be remotely implemented 458 upon the first replication storage object 412, and the second replication write operation (2) 456 may be remotely implemented 460 upon the second replication storage object 416.

Figure 4E:
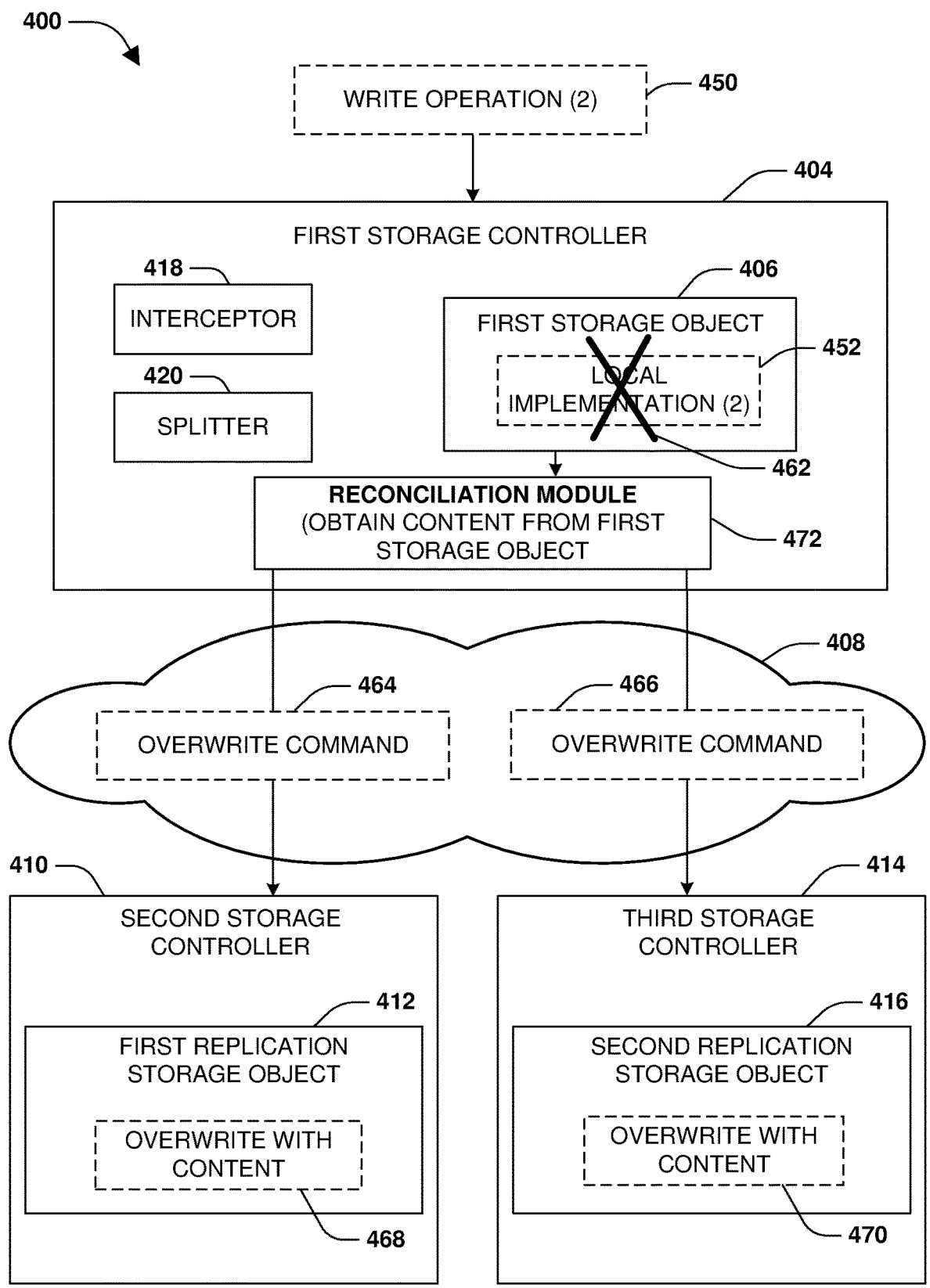
FIG. 4E is a component block diagram illustrating an exemplary computing device for synchronous replication, where a reconciliation is performed.

FIG. 4E illustrates a reconciliation module 472 detecting that the local implementation 452 of the write operation (2) 450 has failed 462. Accordingly, the reconciliation module 472 may obtain content from the first storage object 406 (e.g., data currently stored within the first storage object 406 that was to be modified by the write operation (2) 450). The reconciliation module 472 may perform a first overwrite command 464 to overwrite 468 corresponding data within the first replication storage object 412 using the content from the first storage object 452. The reconciliation module 472 may perform a second overwrite command 466 to overwrite 470 corresponding data within the second replication storage object 416 using the content from the first storage object 452. In this way, data between the first storage object 406, the first replication storage object 412, and the second replication storage object 416 may be consistent notwithstanding the failure 462. In another example, the reconciliation module 472 may be used when a protocol aborts an inflight operation since the splitter 420 implements parallel splitting to multiple synchronous replicated copies and cannot control which operations (e.g., a first replication write operation, a second replication write operation, etc.) are aborted prior to processing on respective storage controllers.

Figure 4F:
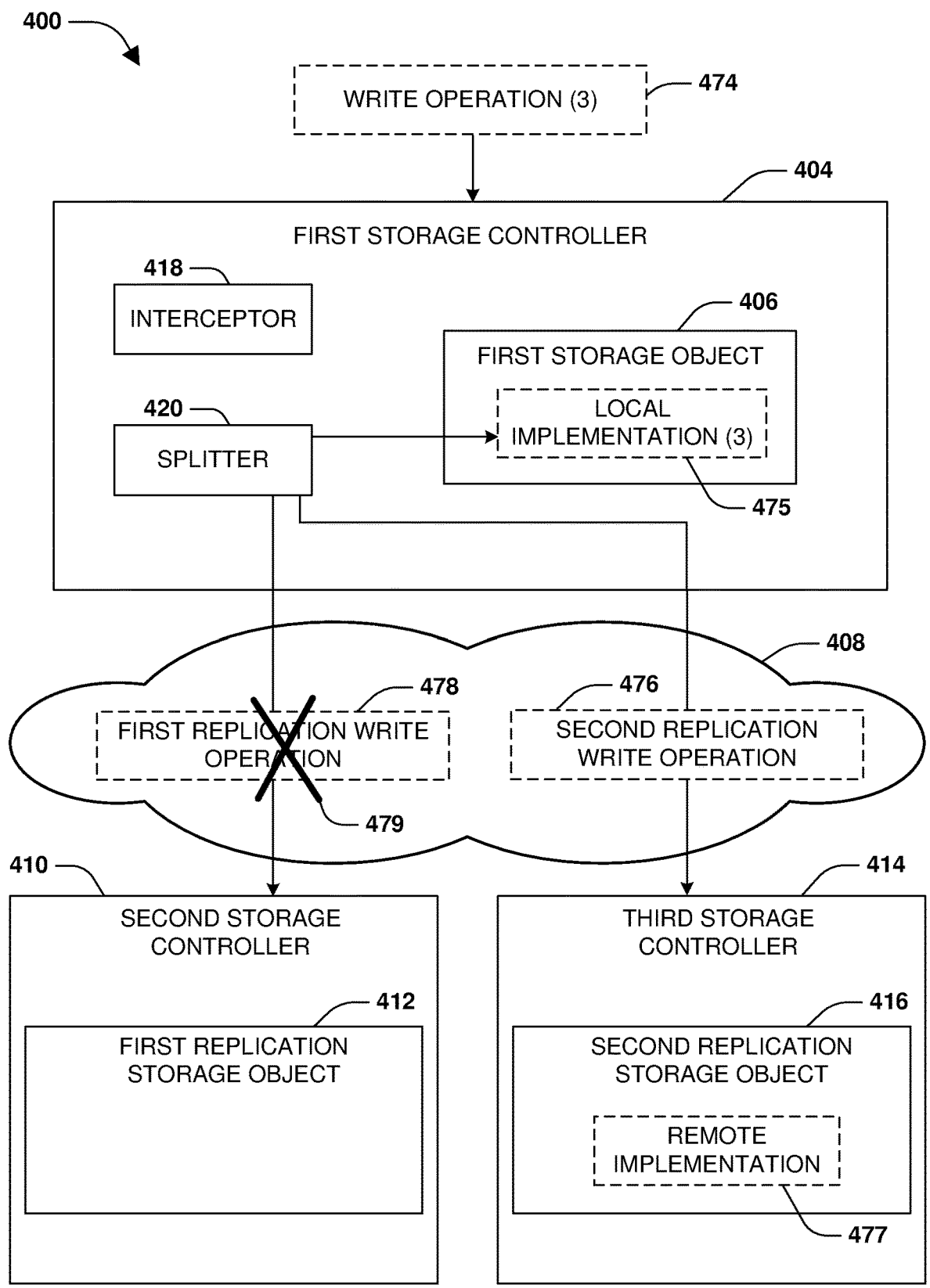
FIG. 4F is a component block diagram illustrating an exemplary computing device for synchronous replication, where a first replication write operation fails.

FIG. 4F illustrates a write operation (3) 474, targeting the first storage object 406, being intercepted by the interceptor 418. Because the write operation (3) 474 targets the first storage object 406 having the first synchronous replication relationship 422 and the second synchronous replication relationship 424, the interceptor 418 may pass the write operation (3) 474 to the splitter 420 for the first storage object 406. The splitter 420 may split the write operation (3) 474 into a first replication write operation (3) 478, targeting the first replication storage object 412, and a second replication write operation (3) 476 targeting the second replication storage object 416. Accordingly, the write operation (3) 474, the first replication write operation (3) 478, and the second replication write operation (3) 476 may be implemented in parallel. For example, the write operation (3) 474 may be locally implemented 475 upon the first storage object 406, the first replication write operation (3) 478 may be remotely implemented upon the first replication storage object 412, and the second replication write operation (3) 476 may be remotely implemented 477 upon the second replication storage object 416.

Figure 4G:
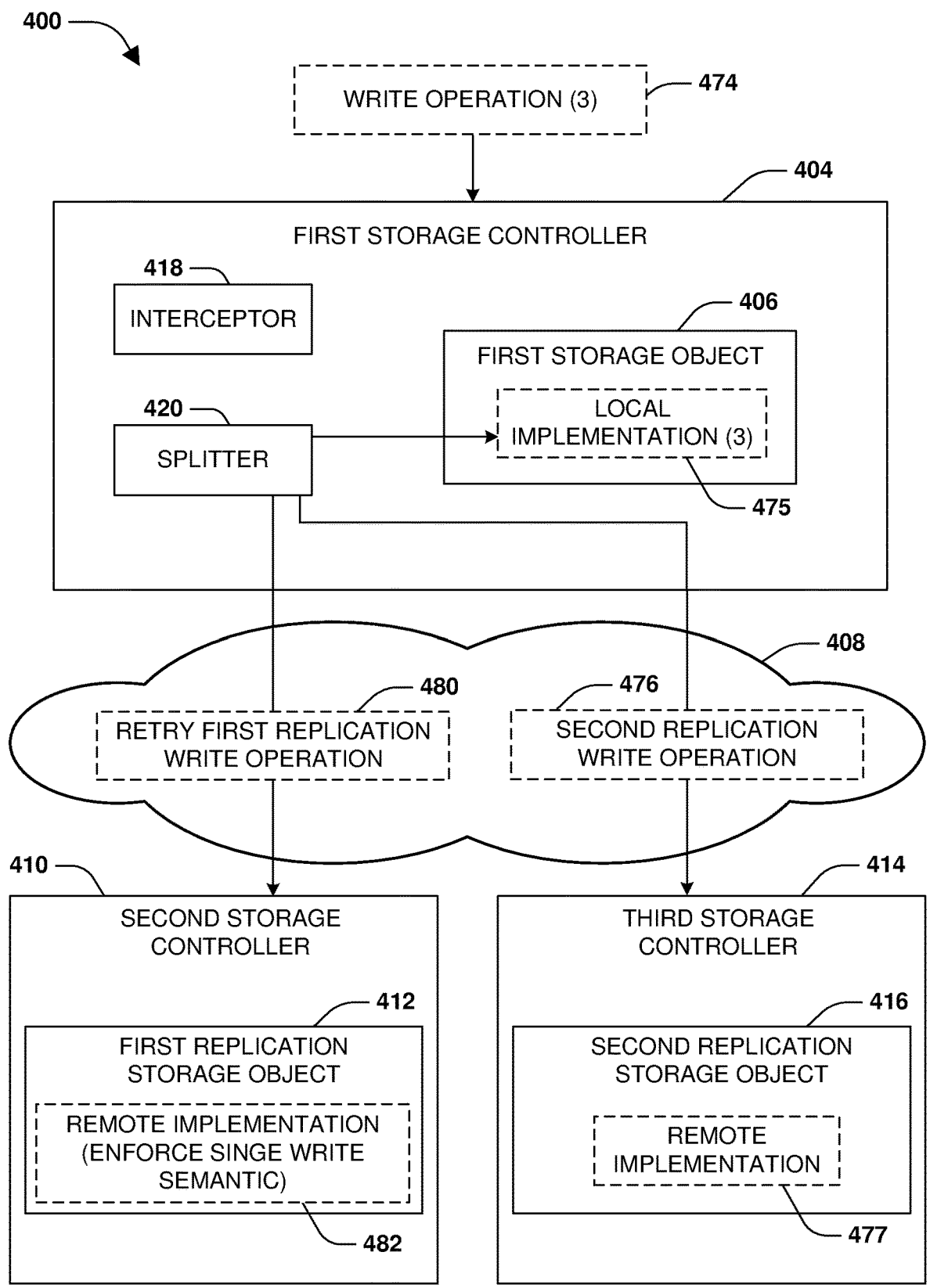
FIG. 4G is a component block diagram illustrating an exemplary computing device for synchronous replication, where a first replication write operation is retried.

In an example, a failure to implement the first replication write operation (3) 478 may be determined, such as by an inflight time tracker module. Accordingly, a retry first replication operation 480 may be sent to the second storage controller 410 for implementation upon the first replication storage object 412, as illustrated in FIG. 4G. Accordingly, a single write semantic 482 may be enforced for the first replication write operation (3) 478 and the retry first replication write operation 480. For example, responsive to the first replication write operation (3) 478 being successfully performed, the retry first replication write operation 480 may be discarded. Responsive to the retry first replication write operation 480 being successfully performed, the first replication write operation (3) 478 may be discarded. In this way, duplicate or stale operations may be detected and discarded.

Figure 4H:
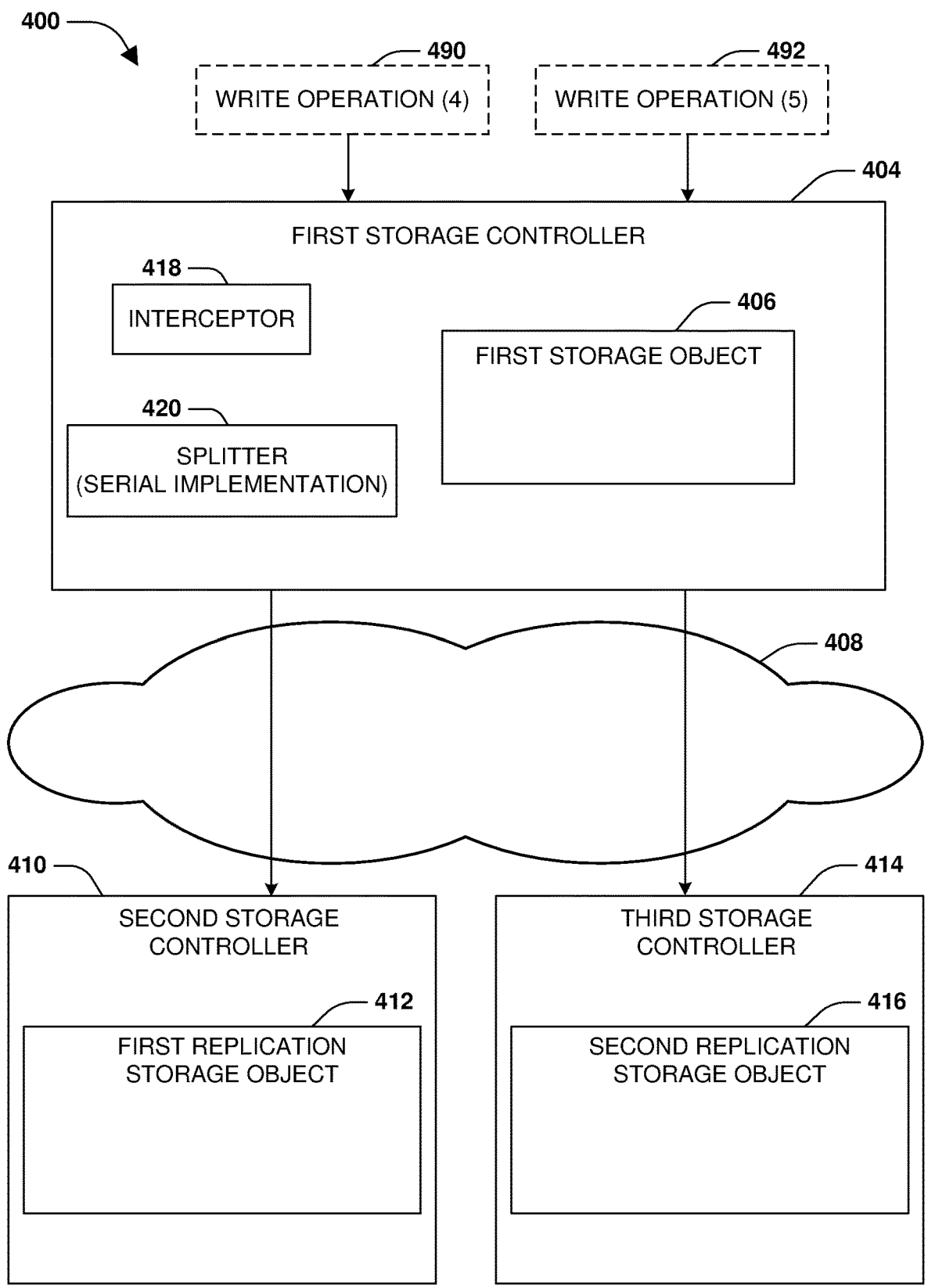
FIG. 4H is a component block diagram illustrating an exemplary computing device for synchronous replication, where a dependent write order consistency is enforced for dependent write operations.

FIG. 4H illustrates a write operation (4) 490 and a write operation (5) 492 being intercepted by the interceptor 418. The interceptor 418 may determine that the write operation (4) 490 and the write operation (5) 492 both target the first storage object 406, and thus are attempting to modify an overlapping region of storage. Accordingly, the splitter 420 may serially implement the write operation (4) 490 and the write operation (5) 492 (e.g., and thus serially implement replication write operations of the write operation (4) 490 and replication write operations of the write operation (5) 492) because the write operation (4) 490 and the write operation (5) 492 have a dependency.

Figure 4I:
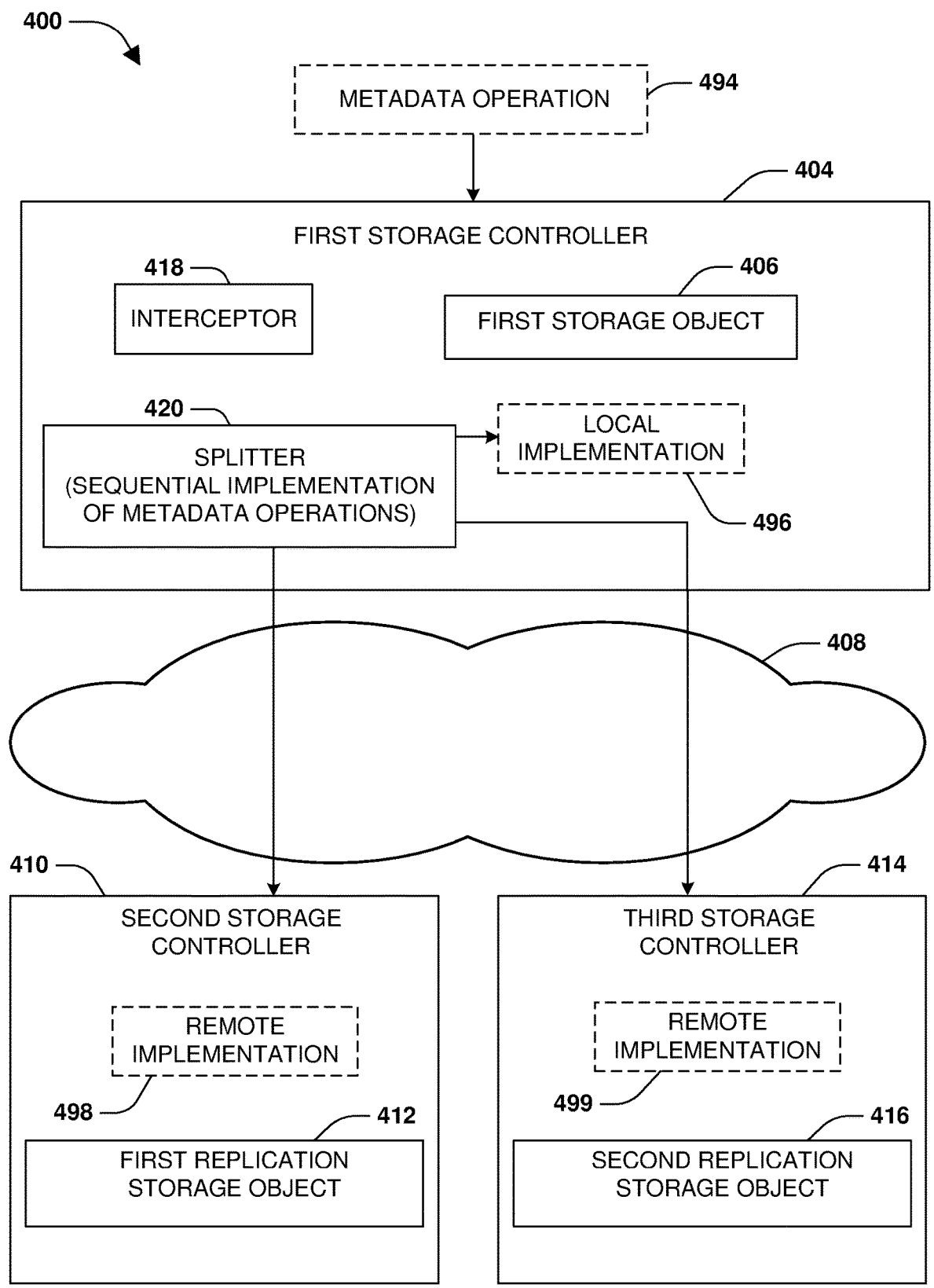
FIG. 4I is a component block diagram illustrating an exemplary computing device for synchronous replication, where metadata operations are sequentially processed.

FIG. 4I illustrates an example of metadata operation replication. For example, a metadata operation 494 (e.g., a LUN, file, volume, or other storage object create, modify, or delete operation; a consistency point creation operation; a resync point creation operation; a clone operation; etc.) may be received by the first storage controller 404. The metadata operation 494 may be locally implemented 496 by the first storage controller 404. Because metadata operations are implemented in a serial manner, once the metadata operation 484 is successfully implemented, the metadata operation 494 may be replicated and remotely implemented 498 by the second storage controller 410 and remotely implemented 499 by the third storage controller 414 (e.g., the metadata operation 494 may be sent in parallel to the second storage controller 410 and the third storage controller 414 after the local implementation 496 successfully completes).

Figure 5:
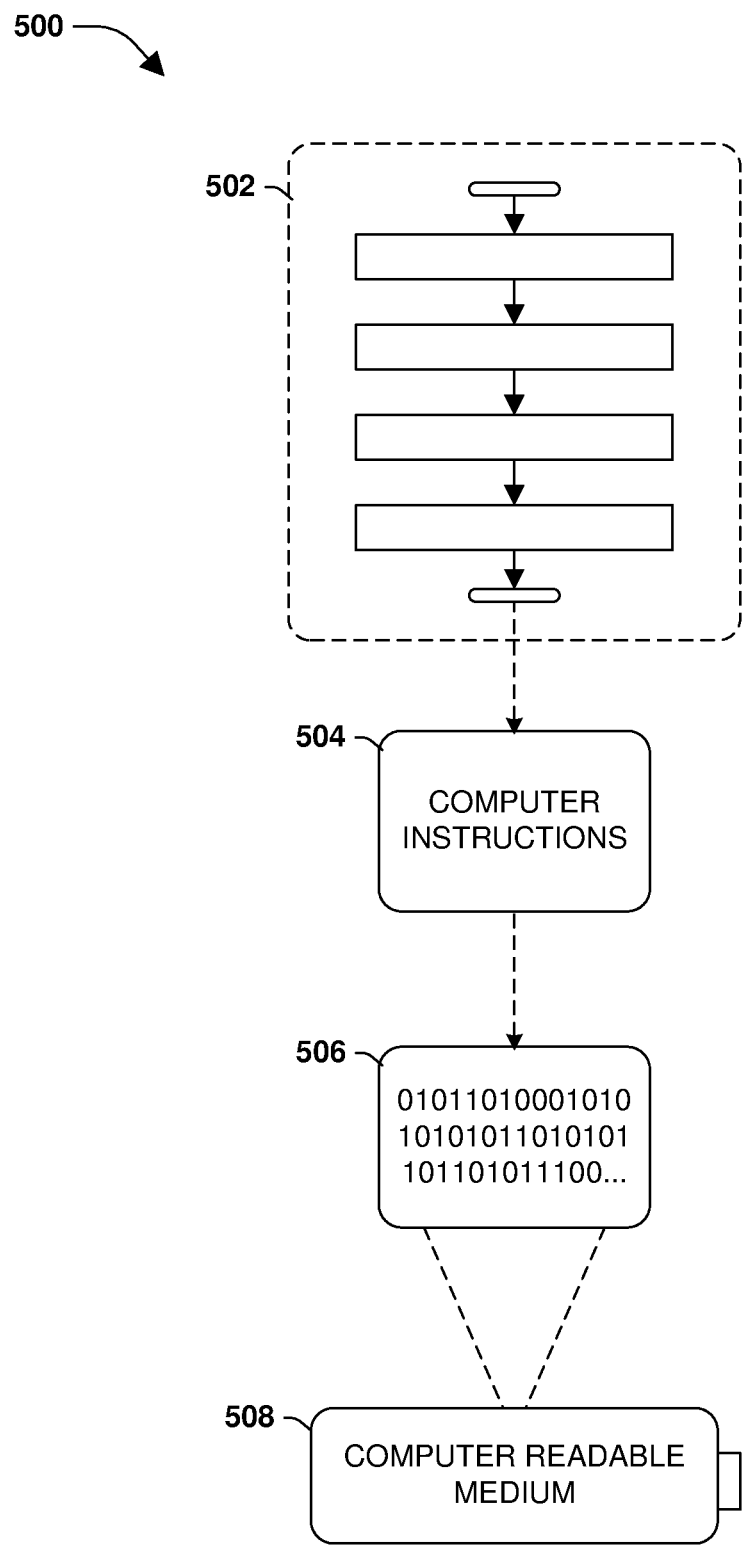
FIG. 5 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 5, wherein the implementation 500 comprises a computer-readable medium 508, such as a CD-ft DVD-R, flash drive, a platter of a hard disk drive, etc., on which is encoded computer-readable data 506. This computer-readable data 506, such as binary data comprising at least one of a zero or a one, in turn comprises a processor-executable computer instructions 504 configured to operate according to one or more of the principles set forth herein. In some embodiments, the processor-executable computer instructions 504 are configured to perform a method 502, such as at least some of the exemplary method 300 of FIG. 3, for example. In some embodiments, the processor-executable computer instructions 504 are configured to implement a system, such as at least some of the exemplary system 400 of FIGS. 4A-4I, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
receiving a write operation targeting a first storage object having a synchronous replication relationship with a first replication storage object and a second replication storage object;
splitting the write operation into a first replication write operation targeting the first replication storage object and a second replication write operation targeting the second replication storage object; and
implementing the write operation upon the first storage object, the first replication write operation upon the first replication storage object, and the second replication write operation upon the second replication storage object in parallel; wherein the write operation is implemented as a zero-copy operation using a data reference in place of copying data by using an original copy of data within the write operation for at least one of an initial replication attempt or a subsequent replication attempt.

2. The method of claim 1, comprising:
responsive to detecting a failure, performing a reconciliation between the first storage object, the first replication storage object, and the second replication storage object, wherein the reconciliation comprises:
withholding a current client acknowledgment for an operation associated with the failure;
reading content, targeted by the operation, from the first storage object;
writing the content to the first replication storage object and the second replication storage object; and
releasing the current client acknowledgment.

3. The method of claim 2, comprising:
responsive to successfully writing the content so that data within the first storage object, the first replication storage object, and the second replication storage object have data symmetry, utilizing one or more consistency points to perform a data integrity validation to flag data corruption or data loss issues.

4. The method of claim 1, comprising responsive to detecting a failure, performing a reconciliation between the first storage object, the first replication storage object, and the second replication storage object.

5. The method of claim 1, comprising enforcing a single write semantic for the first replication storage object.

6. The method of claim 1, comprising responsive to a lifecycle indicating that performance of the first replication write operation has encountered an issue, retrying the first replication write operation as a retry first replication write operation.

7. The method of claim 6, comprising:
enforcing a single write semantic for the first replication storage object, the single write semantic specifying:
responsive to the first replication write operation being successfully performed, disregarding the retry first replication write operation; and
responsive to the retry first replication write operation being successfully performed, disregarding the first replication write operation.

8. The method of claim 1, comprising:
receiving a second write operation; and
responsive to the second write operation and the write operation having a dependency, enforcing a dependent write order consistency for the write operation and the second write operation.

9. The method of claim 8, comprising:
determining that the second write operation and the write operation have the dependency based upon the write operation and the second write operation overlapping a same region that is to be modified.

10. The method of claim 8, wherein the enforcing the dependent write order consistency comprises serially implementing the write operation and the second write operation.

11. The method of claim 1, comprising:
receiving a metadata operation for a first storage controller hosting the first storage object; and
implementing the metadata operation upon the first storage controller and replicating the metadata operation to a second storage controller hosting the first replication storage object and a third storage controller hosting the second replication storage object.

12. The method of claim 11, wherein the metadata operation comprises at least one of an application consistency point creation operation, a resync point creation operation, a clone operation, an attribute modification operation, a create operation, a volume operation, a logical unit number (LUN) operation, or a delete operation.

13. The method of claim 1, wherein the first storage object is exposed with read and write access, and the first replication storage object and the second replication storage object are exposed with read only access with a write access option when a failover is performed.

14. The method of claim 1, wherein a first storage controller hosting the first storage object and a second storage controller hosting the first replication storage object are maintained within a same data center.

15. The method of claim 1, wherein a first storage controller hosting the first storage object and a second storage controller hosting the first replication storage object are maintained within different data centers.

16. The method of claim 1, comprising performing load balancing between the first replication storage object and the second replication storage object.

17. A non-transitory machine readable medium having stored thereon instructions for performing a method comprising machine executable code which when executed by a machine, causes the machine to:
receive a write operation targeting a first storage object having a synchronous replication relationship with a first replication storage object and a second replication storage object;
split the write operation into a first replication write operation targeting the first replication storage object and a second replication write operation targeting the second replication storage object; and
implement the write operation upon the first storage object, the first replication write operation upon the first replication storage object, and the second replication write operation upon the second replication storage object in parallel; wherein the write operation is implemented as a zero-copy operation using a data reference in place of copying data by using an original copy of data within the write operation for at least one of an initial replication attempt or a subsequent replication attempt.

18. The non-transitory machine readable medium of claim 17, wherein the machine executable code causes the machine to:
- determining that the first replication write operation encountered an error based upon a lifecycle of the first replication write operation.

19. A computing device comprising:
- a memory storing instructions; and
- a processor coupled to the memory, the processor configured to execute the instructions to perform operations comprising:
- receiving a write operation targeting a first storage object having a synchronous replication relationship with a first replication storage object and a second replication storage object;
- splitting the write operation into a first replication write operation targeting the first replication storage object and a second replication write operation targeting the second replication storage object; and
- implementing the write operation upon the first storage object, the first replication write operation upon the first replication storage object, and the second replication write operation upon the second replication storage object in parallel, wherein the write operation is implemented as a zero-copy operation using a data reference in place of copying data by using an original copy of data within the write operation for at least one of an initial replication attempt or a subsequent replication attempt.

* * * * *